(12) United States Patent
Imai et al.

(10) Patent No.: US 8,627,445 B2
(45) Date of Patent: Jan. 7, 2014

(54) PROXY CONNECTION METHOD AND ADAPTER TO IMS/MMD NETWORK

(75) Inventors: Naoki Imai, Saitama (JP); Manabu Isomura, Saitama (JP); Hiroki Horiuchi, Saitama (JP)

(73) Assignee: KDDI Corporation, Tokyo (JP)

( * ) Notice: Subject to any disclaimer, the term of this patent is extended or adjusted under 35 U.S.C. 154(b) by 873 days.

(21) Appl. No.: 12/041,318

(22) Filed: Mar. 3, 2008

(65) Prior Publication Data

US 2008/0216167 A1 Sep. 4, 2008

(30) Foreign Application Priority Data

Mar. 3, 2007 (JP) ................................. 2007-053550

(51) Int. Cl.
*H04L 29/06* (2006.01)
*G06F 15/16* (2006.01)

(52) U.S. Cl.
USPC ................ 726/12; 726/14; 709/228; 370/392

(58) Field of Classification Search
USPC ........ 726/2–4, 12, 14, 15; 709/227, 228, 245; 370/389, 392, 395.5
See application file for complete search history.

(56) References Cited

U.S. PATENT DOCUMENTS

| | | | | |
|---|---|---|---|---|
| 6,980,556 B2 * | 12/2005 | Vimpari | .................... | 370/395.52 |
| 6,993,595 B1 * | 1/2006 | Luptowski et al. | ........... | 709/245 |
| 7,328,281 B2 * | 2/2008 | Takeda et al. | ................. | 709/246 |
| 7,411,967 B2 * | 8/2008 | Thubert et al. | ................ | 370/401 |
| 7,773,983 B2 * | 8/2010 | Takeda | .......................... | 455/420 |
| 2003/0135586 A1 * | 7/2003 | Minborg et al. | .............. | 709/219 |
| 2004/0057435 A1 * | 3/2004 | Ruyle et al. | ................. | 370/395.5 |
| 2005/0222815 A1 * | 10/2005 | Tolly | ............................. | 702/185 |
| 2006/0253873 A1 * | 11/2006 | Lim et al. | ........................ | 725/62 |
| 2007/0060124 A1 * | 3/2007 | Kalavade | ...................... | 455/433 |
| 2007/0180485 A1 * | 8/2007 | Dua | ............................... | 725/114 |
| 2007/0183363 A1 * | 8/2007 | Liden | ............................ | 370/331 |
| 2008/0144602 A1 * | 6/2008 | Casey | .......................... | 370/352 |

FOREIGN PATENT DOCUMENTS

| | | |
|---|---|---|
| JP | 2004-7321 A | 1/2004 |
| JP | 2004-193739 A | 7/2004 |

* cited by examiner

*Primary Examiner* — Zachary A Davis
(74) *Attorney, Agent, or Firm* — Westerman, Hattori, Daniels & Adrian, LLP

(57) ABSTRACT

A client for IPv4 having a SIP function sends a first REGISTER message to an adapter. Then, the adapter executes an authentication sequence of EAP-AKA for an access gateway connected between an IMS/MMD network and an IPv4 network, then establishes a tunnel connection. Then, the adapter generates a second REGISTER message corresponding to IPv6 based on the first REGISTER message corresponding to IPv4. The adapter sends the second REGISTER message to a SIP server connected to the IMS/MMD network through the tunnel connection to the access gateway.

16 Claims, 4 Drawing Sheets

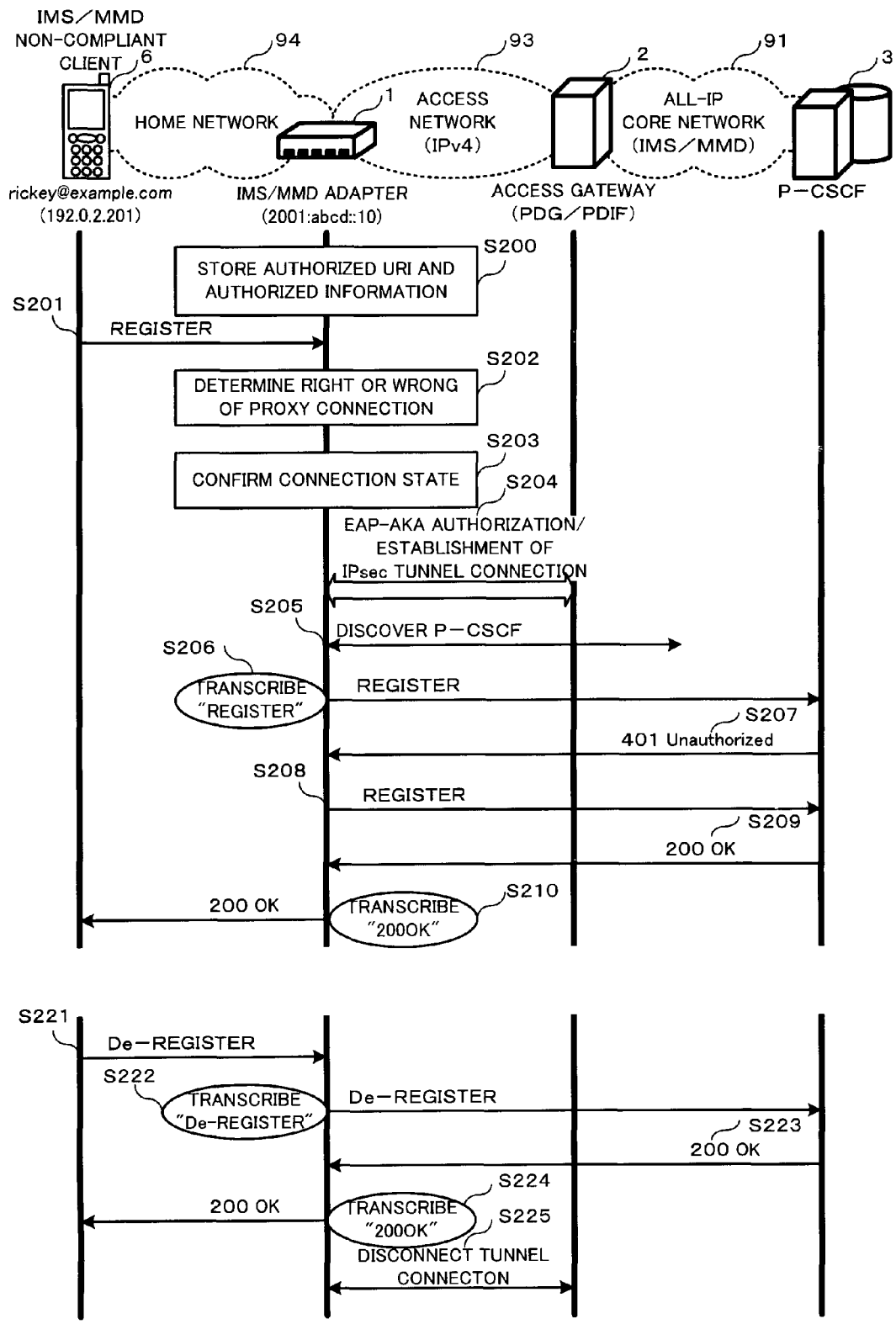

Fig. 3

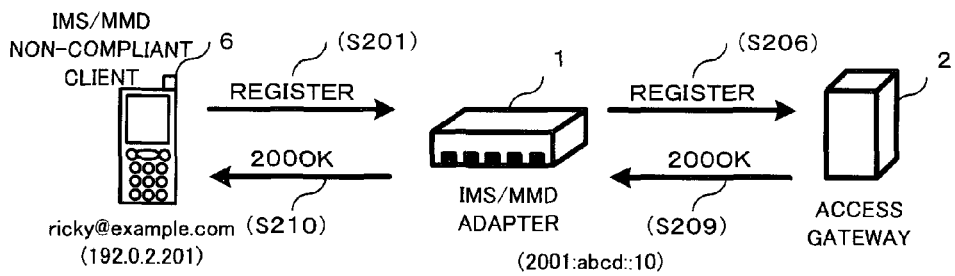

REGISTER sip:ss1.example.com SIP/2.0
Max-Forwards: 70
Via: SIP/2.0/UDP 192.0.2.201;branch=z9hG4bK74aj7
From: <sip:ricky@example.com>;tag=9fxctr75e
To: <sip:ricky@example.com>
Call-ID: 38576@192.0.2.201
CSeq: 27084 REGISTER
Contact: <sip:ricky@192.0.2.201>
Contact-Length: 0
Authorization:
Proxy-Require:
Require:
Security-Client:
Supported:

REGISTER sip:ss1.example.com SIP/2.0
Max-Forwards: 70
Via: SIP/2.0/UDP 2001:abcd::10;branch=z9hG4bK74aj7
From: <sip:ricky@example.com>;tag=9fxctr75e
To: <sip:ricky@example.com>
Call-ID: 38576@2001:abcd::10
CSeq: 27084 REGISTER
Contact: <sip:ricky@2001:abcd::10>
Contact-Length: 0
Authorization:
Proxy-Require:
Require:
Security-Client:
Supported:

SIP/2.0 200 OK
Via: SIP/2.0/UDP 192.0.2.201;branch=z9hG4bK74aj7
From: <sip:ricky@example.com>;tag=9fxctr75e
To: <sip:ricky@example.com>;tag=37GkEhw16
Call-ID: 38576@192.0.2.201
CSeq: 27084 REGISTER
Contact: <sip:ricky@192.0.2.201>;expires=3600
Contact-Length: 0
Path:
P-Associated-URI:

SIP/2.0 200 OK
Via: SIP/2.0/UDP 2001:abcd::10;branch=z9hG4bK74aj7
From: <sip:ricky@example.com>;tag=9fxctr75e
To: <sip:ricky@example.com>;tag=37GkEhw16
Call-ID: 38576@2001:abcd::10
CSeq: 27084 REGISTER
Contact: <sip:ricky@2001:abcd::10>;expires=3600
Contact-Length: 0
Path:
P-Associated-URI:

PROXY CONNECTION METHOD AND ADAPTER TO IMS/MMD NETWORK

PRIORITY CLAIM

The present application claims priority to Japanese Patent Application No. 2007-053550 filed on Mar. 3, 2007, which is incorporated herein by reference.

BACKGROUND OF THE INVENTION

1. Field of the Invention

The present invention relates to a method and an adapter connected to an IMS/MMD (IP Multimedia Subsystem/Multimedia Domain) network.

2. Description of the Related Art

3GPP2 (3rd Generation Partnership Project 2, the standard of a third-generation mobile phone system) or 3GPP standardizes an IMS/MMD platform to make a mobile communication network ALL-IP. The IMS/MMD platform (hereinafter called "ALL-IP core network") uses IPv6 technology. This is an important base technology in the next generation network (NGN: Next Generation Network). According to J. Rosenberg et al., "SIP: Session Initiation Protocol", IETF RFC3261, June, 2002, the ALL-IP core network uses SIP (Session Initiation Protocol) for communication control of multimedia data including voice data.

According to SIP, position information of a client (e.g., a mobile terminal) is registered in a registrar server. The SIP proxy server connects these clients by using the registration information.

Actually, the ALL-IP core network incorporates an authentication/encrypting protocol such as IMS-AKA (IP Multimedia Subsystem/Authentication and Key Agreement) into basic SIP. An IPv6 client having a SIP enhanced function of 3GPP or 3GPP2 can connect with the ALL-IP core network directly.

However, many existing clients such as a portable telephone do not comprise a protocol stack of IPv6. Also, these clients cannot process an encrypting protocol which requires high computing power. Thus, even if these clients comprise a SIP function, they cannot execute a registration authentication sequence for the registrar server connected to the ALL-IP core network. Such a problem disturbs early conversion to IMS/MMD.

BRIEF SUMMARY OF THE INVENTION

Thus, the object of the present invention is to provide a proxy connection method and an adapter which enables an IMS/MMD non-compliant client having a SIP function to communicate with an IMS/MMD compliant client through the IMS/MMD network.

The present invention is based on a proxy connection method of an adapter for communicating with a SIP server connected to a first network of the IPv6, an access gateway connected between the first network and a second network of IPv4, and a client for IPv4 having a SIP function. The adapter is connected to the second network between the access gateway and the client.

According to the present invention, the method has a first step in which the client sends a first registration request to the adapter, a second step in which the adapter establishes a tunnel connection to the access gateway, a third step in which the adapter generates a second registration request corresponding to IPv6 based on the first registration request corresponding to IPv4, and a fourth step in which the adapter sends the second registration request to the SIP server through the tunnel connection to the access gateway.

It is preferred that the adapter stores in advance a SIP address authorized for a proxy connection, and wherein, for the second step, the adapter determines whether a registration address included in the first registration request matches with the SIP address previously stored. If they match, the adapter establishes the tunnel connection to the access gateway.

It is preferred that, for the second step, the adapter discovers the address of the access gateway by searching for a DNS (Domain Name System) server connected to the second network.

It is preferred that, for the second step, the adapter executes an authentication sequence of EAP-AKA (Extensible Authentication Protocol Method for 3rd Generation Authentication and Key Agreement), and then the adapter establishes the tunnel connection according to IPsec (Internet Protocol security protocol).

It is preferred that, for the third step, the adapter generates the second registration request by using an IPv6 address obtained at the time of establishment of the tunnel connection in the second step.

It is preferred that, for the fourth step, the adapter discovers the address of the SIP server by referring to a DHCP (Dynamic Host Configuration Protocol) server connected to the first network.

It is preferred that, for the fourth step, the adapter discovers a DNS server connected to the first network by referring to a DHCP server connected to the first network, and then discovers the address of the SIP server by searching for the DNS server.

It is preferred that the first network is based on IMS/MMD (IP Multimedia Subsystem/Multimedia Domain), and wherein, for the fourth step, the adapter sends a REGISTER of the second registration request to the SIP server through the tunnel connection to the access gateway, the SIP server sends a 401 Unauthorized to the adapter through the tunnel connection to the access gateway, the adapter sends a second REGISTER of the response to the SIP server through the tunnel connection to the access gateway, the SIP server transmits a first 200 OK through the tunnel connection to the access gateway, and the adapter sends a second 200 OK based on the first 200 OK to the client.

According to the present invention, the adapter has client side SIP transmit/receive means for receiving the first registration request from the client;

tunnel connection establishment means for establishing a tunnel connection to the access gateway, when the first registration request is received;

the second registration request generating means for generating a second registration request corresponding to IPv6 based on the first registration request corresponding to IPv4; and server side SIP transmit/receive means for sending the second registration request to the SIP server through the tunnel connection to the access gateway.

It is preferred that the adapter further has authorization address memory means for storing in advance a SIP address authorized for proxy connection, and determination means for determining whether a registration address included in the first registration request matches with an address authorized for proxy connection, wherein, if they match, the tunnel connection establishment means establishes the tunnel connection to the access gateway.

It is preferred that the tunnel establishment means discovers the address of the access gateway by searching for a DNS server connected to the second network.

It is preferred that the adapter further has authentication means for executing an authentication sequence of EAP-AKA to the access gateway, if the registration address and the address authorized for proxy connection match, and the tunnel connection establishment means establishes the tunnel connection according to IPsec to the access gateway after the execution of the authentication sequence.

It is preferred that the second registration request generating means generates the second registration request by using an IPv6 address obtained at the time of the establishment of the tunnel connection.

It is preferred that the adapter further has SIP-server discovery means for discovering the address of the SIP server by referring to a DHCP server connected to the first network.

It is preferred that the adapter further has SIP-server discovery means for discovering a DNS server connected to the first network by referring to a DHCP server connected to the first network, and discovering the address of the SIP server by retrieving a DNS server.

It is preferred that the first network is based on IMS/MMD, and wherein the server side SIP transmit/receive means sends a REGISTER of the second registration request to a SIP server through a tunnel connection to the access gateway, receives a 401 Unauthorized from the SIP server, sends a second REGISTER including a response to the SIP server, and receives a first 200 OK from the SIP server, and the client side SIP transmit/receive means sends a second 200 OK based on the first 200 OK to the client.

According to the present invention, a method is provided for making a computer to function as an adapter, and the method comprising the steps of:

receiving the first registration request from the client,
establishing a tunnel connection to the access gateway,
generating a second registration request corresponding to IPv6 based on the first registration request corresponding to IPv4, and
sending the second registration request to the SIP server through the tunnel connection to the access gateway.

According to the proxy connection method and the adapter of the present invention, an IMS/MMD non-compliant client having a SIP function can communicate with an IMS/MMD compliant client through the IMS/MMD network.

BRIEF DESCRIPTION OF THE SEVERAL
VIEWS OF THE DRAWINGS

FIG. 2 is a sequence diagram of the present invention.

FIG. 3 is an illustration of a transcription containing messages of a REGISTER and a 200 OK generated and received by the IMS/MMD adapter.

DETAILED DESCRIPTION OF THE INVENTION

Figure 1:
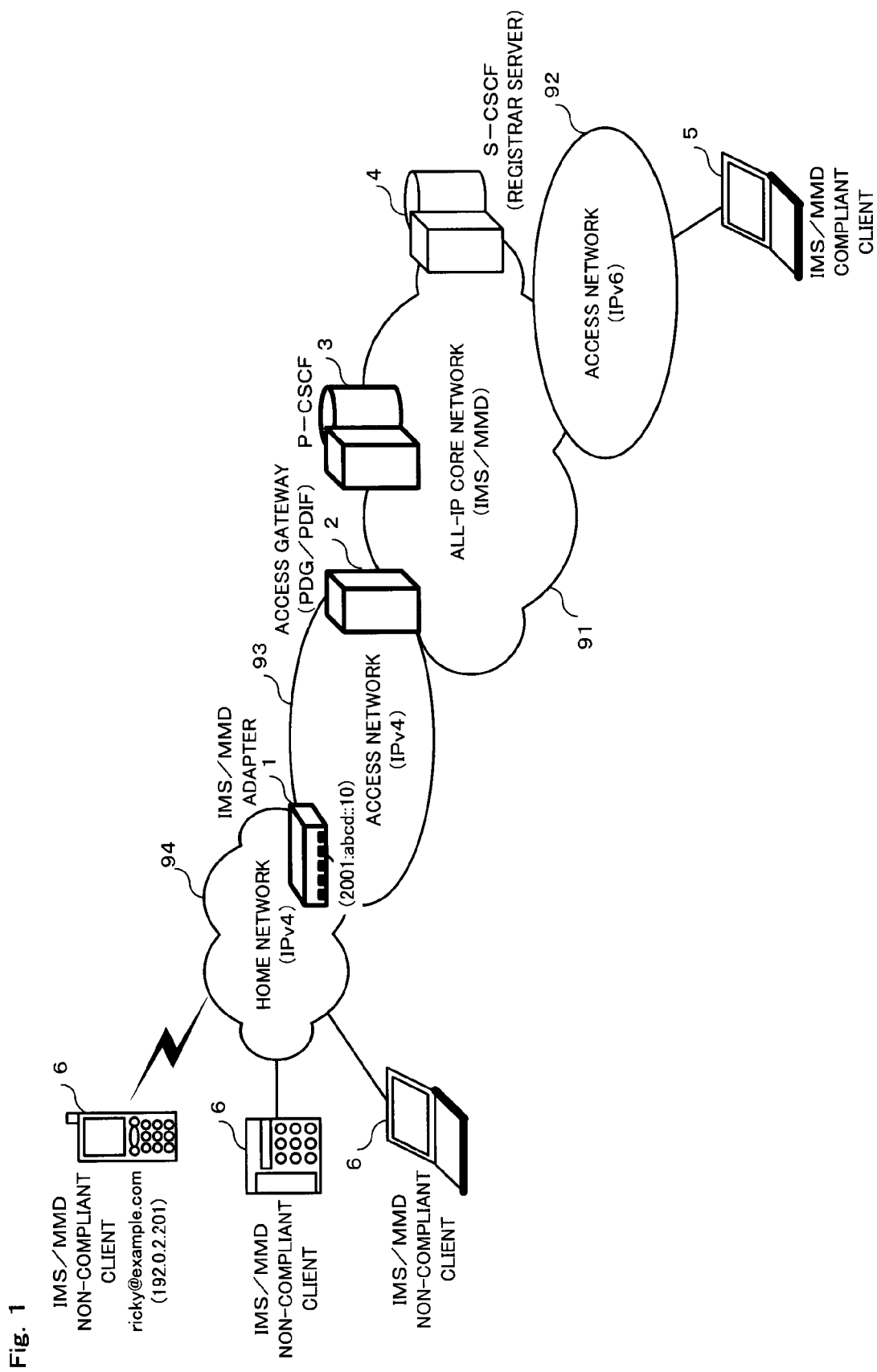
FIG. 1 is a system configuration diagram of the present invention.

FIG. 1 is a system configuration diagram of the present invention.

According to FIG. 1, ALL-IP core network 91 of IMS/MMD is connected to access network 92 of IPv6 and access network 93 of IPv4. IMS/MMD compliant client 5 is connected to access network 92 directly. IMS/MMD compliant client 5 connects with ALL-IP core network 91 through access network 92.

P-CSCF (Proxy-Call Session Control Function) 3 and S-CSCF (Serving-Call Session Control Function) 4 provided in IMS/MMD, are connected to ALL-IP core network 91.

P-CSCF 3 is a SIP server for sending/receiving messages to/from user clients directly. When P-CSCF 3 receives a registration request (REGISTER) from a user client, it executes an authentication sequence and establishes an IPsec tunnel connection. All SIP messages from user clients are safely transferred through the IPsec tunnel connection.

S-CSCF 4 is, for example, a registrar server, and it is a SIP server for storing subscriber information and position information of a user client. This has a session control function between user clients and a routing function to the other client.

Further, access gateway 2 is connected to ALL-IP core network 91, to connect with access network 93 of IPv4. Access gateway 2 has a protocol conversion function between IPv4 and IPv6. Access gateway 2 is called PDG (Packet Data Gateway) according to IMS, or, is called PDIF (Packet Data Inter-working Function) according to MMD.

Access network 93 is interconnected to home network 94 through IMS/MMD adapter 1. IMS/MMD non-compliant client 6 having a SIP function is connected to home network 94. IMS/MMD adapter 1 executes a proxy connection process to ALL-IP network 91 instead of IMS/MMD non-compliant client 6.

IMS/MMD non-compliant client 6 having a SIP function connects to access gateway 2 through IMS/MMD adapter 1, and communicates with P-CSCF 3 and IMS/MMD compliant client 5 connected to IMS/MMD core network 91. IMS/MMD non-compliant client 6 has a SIP function such as in a portable telephone, an IP telephone, an IP television telephone, etc., for example. However, this does not have a connect function to access gateway 2 and an authentication function of IMS/MMD.

FIG. 2 is a sequence diagram of the present invention.

First of all, a registration sequence will be explained.

(S200) IMS/MMD adapter 1 stores in advance a SIP address (SIP-URI (Uniform Resource Identifier)) to authorize proxy connection. Thus, a SIP-URI for which proxy connection is not authorized, is ignored. According to FIG. 2, IMS/MMD adapter 1 stores in advance SIP-URI [rickey@example.com] of IMS/MMD non-compliant client 6. Further, IMS/MMD adapter 1 stores in advance the authentication information to access gateway 2.

(S201) IMS/MMD non-compliant client 6 transmits a REGISTER (registration request) to IMS/MMD adapter 1 set as a SIP proxy.

(S202) IMS/MMD adapter 1 determines whether a SIP-URI described in "From" or "To" of the REGISTER is the SIP-URI authorized for proxy connection previously registered.

(S203) When the SIP-URI of the REGISTER is authorized for proxy connection, IMS/MMD adapter 1 confirms a connection state with access gateway 2 corresponding to the SIP-URI. When IMS/MMD adapter 1 does not recognize the presence of the access gateway 2, a DNS (Domain Name System) server connected to access network 93 is searched for. Thereby, an address of access gateway 2 is discovered.

(S204) When the connection state is unconnected, IMS/MMD adapter 1 executes an EAP-AKA authentication sequence to access gateway 2. Then, IMS/MMD adapter 1 establishes a tunnel connection according to IPsec to access gateway 2. Then, IMS/MMD adapter 1 obtains IPv6 address [2001:abcd::10] of the access gateway 2 when the tunnel connection is established.

(S205) IMS/MMD adapter 1 discovers P-CSCF3 by using for example DHCPv6. The DNS server is searched for, if necessary, and finally, the IP address of P-CSCF3 is obtained.

(S206) IMS/MMD adapter 1 generates a REGISTER (registration request) to send to P-CSCF3 by using the SIP-URI received from IMS/MMD non-compliant client 6. The REGISTER is received by P-CSCF3 through the tunnel connection to access gateway 2. Further, the REGISTER transferred in S201 and the REGISTER transferred in S206 are different DIALOGs.

(S207) P-CSCF3 sends a 401 Unauthorized to IMS/MMD adapter 1.

(S208) Correspondingly IMS/MMD adapter 1 transmits a reply to the Challenge request step-by-step according to IMS/MMD.

(S209) Correspondingly P-CSCF3 sends a 200 OK to IMS/MMD adapter 1.

(S210) IMS/MMD adapter 1 transcribes some of the information of the 200 OK received from P-CSCF3, to a 200 OK to be sent to IMS/MMD non-compliant client 6. The 200 OK is sent to IMS/MMD non-compliant client 6. Next, a registration-cancellation sequence will be explained.

(S221) IMS/MMD non-compliant client 6 sends a De-REGISTER (registration-cancellation) to IMS/MMD adapter 1.

(S222) IMS/MMD adapter 1 sends a De-REGISTER to P-CSCF3 through the tunnel connection to access gateway 2 as a proxy of IMS/MMD non-compliant client 6. Further, the De-REGISTER transferred in S221 and the De-REGISTER transferred in S222 become different DIALOGs.

(S223) Correspondingly P-CSCF3 sends a 200 OK to IMS/MMD adapter 1.

(S224) IMS/MMD adapter 1 transcribes some of the information of the 200 OK received from P-CSCF3, to a 200 OK to be sent to IMS/MMD non-compliant client 6. The 200 OK is sent to IMS/MMD non-compliant client 6.

(S225) Finally, IMS/MMD adapter 1 executes a release of the IPsec tunnel connection to access gateway 2 corresponding to the SIP-URI.

FIG. 3 is an illustration of the transcription containing messages of a REGISTER and a 200 OK generated and received by the IMS/MMD adapter.

According to FIG. 3, the description of [To:] and [Contact:] of the REGISTER received in S201 is transcribed to [To:] and [Contact:] of the REGISTER transmitted in S206. Also, the description of [To:] and [Contact:] of the 200 OK received in S209 is transcribed to [To:] and [Contact:] of a 200 OK transmitted in S210. Further, here, IMS/MMD adapter 1 changes IPv4 address [192.0.2.201] to IPv6 address [2001:abcd::10].

Further, according to FIG. 3, the SIP-URI to the IMS/MMD non-compliant client and the SIP-URI to the SIP server are the same. However, they do not always have to be the same, and it is sufficient if both are correlated to each other by the IMS/MMD adapter.

Figure 4:
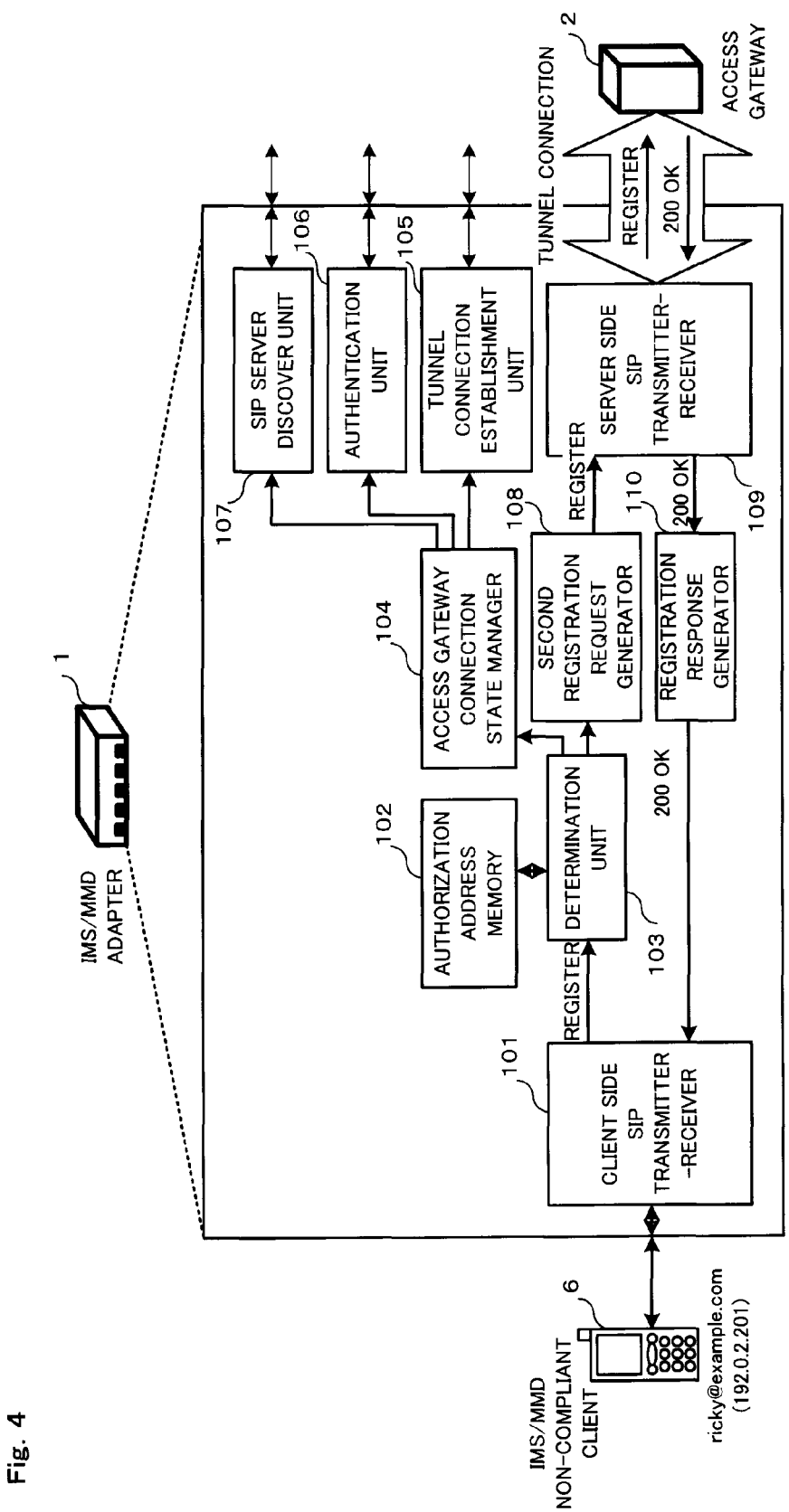
FIG. 4 is a functional configuration diagram of the IMS/MMD adapter of the present invention.

FIG. 4 is functional configuration diagram of the IMS/MMD adapter of the present invention.

According to FIG. 4, IMS/MMD adapter 1 has client side SIP transmitter-receiver 101, authorization address memory 102, determination unit 103, access gateway connection state manager 104, tunnel connection establishment unit 105, authentication unit 106, SIP server discovery unit 107, second registration request generator 108, server side SIP transmitter-receiver 109 and registration response generator 110. These function units can be realized by executing a program on a computer mounted on the IMS/MMD adapter.

Client side SIP transmitter-receiver 101 sends and receives SIP messages and data to and from IMS/MMD non-compliant client 6 through home network 94. When client side SIP transmitter-receiver 101 receives a REGISTER (registration request) from IMS/MMD non-compliant client 6, it forwards the REGISTER to determination unit 103. Also, a 200 OK (i.e., a registration response) received from registration response generator 110 is sent to IMS/MMD non-compliant client 6.

Authorized address memory 102 has previously stored a SIP-URI authorized for proxy connection.

Determination unit 103 determines whether the SIP-URI (included in "From" or "To") included in the REGISTER received by client side SIP transmitter-receiver 101 matches with the SIP-URI authorizing proxy connection stored in authorization address memory 102. The matched result is forwarded to access gateway connection state manager 104.

Also, the matched REGISTER is forwarded to second registration request generator 108.

Access gateway connection state manager 104 manages a connection state with access gateway 2 for every SIP-URL. When access gateway connection state manager 104 receives a matched result from determination unit 103, this determines whether a tunnel connection is established for access gateway 2. When the tunnel connection is not established, access gateway connection state manager 104 instructs tunnel connection establishment unit 105 to establish a tunnel connection.

Also, when an authentication sequence is needed to access gateway 2, access gateway connection state manager 104 instructs authentication unit 106 to execute an authentication sequence. Further, when an IP address of P-CSCF3 connected to ALL-IP core network 91 is unclear, access gateway connection state manager 104 instructs SIP server discovery unit 107 to discover the IP address of P-CSCF3.

Tunnel connection establishment unit 105 establishes a tunnel connection according to IPsec for access gateway 2 based on a designation from access gateway connection state manager 104. Also, when an authentication sequence is executed by authentication unit 106, tunnel connection establishment unit 105 establishes a tunnel connection to an access gateway after the execution of the authentication sequence. Here, when IMS/MMD adapter 1 does not recognize the presence of access gateway 2, tunnel connection establishment unit 105 searches for a DNS server connected to access network 93. Thereby, the address of access gateway 2 is discovered.

Authentication unit 106 executes an authentication sequence of EAP-AKA for an access gateway based on a designation from access gateway connection state manager 104.

SIP server discovery unit 107 discovers the IP address of P-CSCF3 by referring to a DHCP server connected to ALL-IP core network 3.

Second registration request generator 108 generates a REGISTER corresponding to IPv6 based on the REGISTER corresponding to IPv4. The specific example was mentioned above with reference to FIG. 3.

Server side SIP transmitter-receiver 109 sends and receives SIP messages and data for a server connected to ALL-IP core network 91 and an IMS/MMD compliant client through access gateway 2. According to the present invention, server side SIP transmitter-receiver 109 sends a REGISTER of the second registration request to a SIP server through the tunnel connection to the access gateway, and it receives a 401 Unauthorized from the SIP server. Then, server side SIP transmitter-receiver 109 sends a second REGISTER to a SIP server again, and it receives a first 200 OK from the SIP server.

Registration response generator 110 generates a 200 OK to be sent to IMS/MMD non-compliant client 6 based on the 200 OK received from server side SIP transmitter-receiver 109. The generated 200 OK is forwarded to client side SIP transmitter-receiver 101.

According to the proxy connection method and the adapter of the present invention, an IMS/MMD non-compliant client having a SIP function can communicate with an IMS/MMD compliant client through an IMS/MMD network.

Many widely different embodiments of the present invention may be constructed without departing from the spirit and scope of the present invention. It should be understood that the present invention is not limited to the specific embodiments described in the specification, except as defined in the appended claims.

The invention claimed is:

1. A proxy connection method of operating an adapter for connecting an IPv4-compliant client having a SIP (Session Initiation Protocol) function, to a SIP server which is connected with a first IPv6 network, via a second IPv4 network and an access gateway, the IPv4-compliant client being connected with the second IPv4 network, wherein the adapter is connected with the second IPv4 network, the method comprising:

receiving a first REGISTER message from the client via the second IPv4 network, the first REGISTER message being for requesting the SIP server to register position information of the client, and the first REGISTER message having an IPv4 address of the client;

upon reception of the first REGISTER message, establishing a tunnel connection between the adapter and the access gateway on the second IPv4 network, to thereby allow use of an IPv6 address for communication between the adapter and the access gateway, via the second IPv4 network;

upon establishment of the tunnel connection, retrieving an IPv6 address of the access gateway via the established tunnel connection, and generating a second REGISTER message from the first REGISTER message, the second REGISTER message having the retrieved IPv6 address of the access gateway;

sending the second REGISTER message to the SIP server through the tunnel connection, the access gateway and the first IPv6 network sequentially, to thereby allow the SIP server to register the position information of the client as the same address as the IPv6 address of the access gateway; and disconnecting the tunnel connection upon completion of the registration of the position information of the client at the SIP server, wherein use of the tunnel connection allows address translation for the client between the first IPv6 network and the second IPv4 network, to thereby allow the IPv4-compliant client to be connected to an IPv6-compliant client which is connected with the first IPv6 network.

2. The proxy connection method according to claim 1, wherein the adapter has stored therein a SIP address for which proxy connection has been authorized, and the establishing includes making a determination as to whether or not a to-be-registered address included in the first REGISTER message matches the SIP address stored in the adapter, and establishing the tunnel connection, if the to-be-registered address matches the SIP address.

3. The proxy connection method according to claim 1, wherein the establishing includes discovering an address of the access gateway using a DNS (Domain Name System) server connected to the second IPv4 network.

4. The proxy connection method according to claim 1, wherein the establishing includes executing an authentication sequence of EAP-AKA (Extensible Authentication Protocol Method for 3rd Generation Authentication and Key Agreement), and thereafter, establishing the tunnel connection according to IPSec (Internet Protocol security protocol).

5. The proxy connection method according to claim 1, wherein the generating includes obtaining the IPv6 address of the access gateway when the tunnel connection is established, and generating the second REGISTER message using the obtained IPv6 address of the access gateway.

6. The proxy connection method according to claim 1, wherein the sending includes discovering an address of the SIP server using a DHCP (Dynamic Host Configuration Protocol) server connected to the first IPv6 network.

7. The proxy connection method according to claim 1, wherein the sending includes discovering a DNS (Domain Name System) server connected to the first IPv6 network using a DHCP (Dynamic Host Configuration Protocol) server connected to the first IPv6 network, and discovering an address of the SIP server using the DNS server.

8. The proxy connection method according to claim 1, wherein the second IPv4 network includes an IPv4 access network connected with the first IPv6 network via the access gateway, and an IPv4 home network with which the IPV4-compliant client is connected, with the IPv4 access network and the IPv4 home network interconnected via the adapter.

9. An adapter for connecting an IPv4-compliant client having a SIP (Session Initiation Protocol) function, to a SIP server which is connected with a first IPv6 network, via a second IPv4 network and an access gateway, the IPv4-compliant client being connected with the second IPv4 network, wherein the adapter is connected with the second IPv4 network, the adapter comprising:

a client-side SIP transceiver that receives a first REGISTER message from the client via the second IPv4 network, the first REGISTER message being for requesting the SIP server to register position information of the client, and the first REGISTER message having an IPv4 address of the client;

a tunnel-connection establishment unit configured to establish a tunnel connection between the adapter and the access gateway on the second IPv4 network, to thereby allow use of an IPv6 address for communication between the adapter and the access gateway, via the second IPv4 network, upon reception of the first REGISTER message;

a second-REGISTER-message generator configured to retrieve an IPv6 address of the access gateway via the established tunnel connection, and generate a second REGISTER message from the first REGISTER message, the second REGISTER message having the retrieved IPv6 address of the access gateway, upon establishment of the tunnel connection;

a server-side SIP transceiver that sends the second REGISTER message to the SIP server through the tunnel connection, the access gateway and the first IPv6 network sequentially, to thereby allow the SIP server to register the position information of the client as the same address as the IPv6 address of the access gateway; and, a tunnel-connection disconnection unit configured to disconnect the tunnel connection upon completion of the registration of the position information of the client at the SIP server, wherein use of the tunnel connection allows address translation for the client between the first IPv6 network and the second IPv4 network, to thereby allow the IPv4-compliant client to be connected to an IPv6-compliant client which is connected with the first IPv6 network.

10. The adapter according to claim 9, further comprising an authorization address memory in which a SIP address for which proxy connection has been authorized is stored, wherein the tunnel-connection establishment unit is configured to make a determination as to whether or not a to-be-registered address included in the first REGISTER message matches the SIP address stored in the authorization address memory, and to establish the tunnel connection, if the to-be-registered address matches the SIP address.

11. The adapter according to claim 9, wherein the tunnel-connection establishment unit is configured to discover an address of the access gateway using a DNS (Domain Name System) server connected to the second IPv4 network.

12. The adapter according to claim 9, wherein the tunnel-connection establishment unit is configured to execute an authentication sequence of EAP-AKA (Extensible Authentication Protocol Method for 3rd Generation Authentication and Key Agreement), and thereafter, to establish the tunnel connection according to IPSec (Internet Protocol Security protocol).

13. The adapter according to claim 9, wherein the second-REGISTER-message generator is configured to obtain the IPv6 address of the access gateway when the tunnel connection is established, and to generate the second REGISTER message using the obtained IPv6 address of the access gateway.

14. The adapter according to claim 9, further comprising a first SIP-server discover unit configured to discover an address of the SIP server using a DHCP (Dynamic Host Configuration Protocol) server connected to the first IPv6 network.

15. The adapter according to claim 9, further comprising a second SIP-server discover unit configured to discover a DNS (Domain Name System) server connected to the first IPv6 network using a DHCP (Dynamic Host Configuration Protocol) server connected to the first IPv6 network, and to discover an address of the SIP server using the DNS server.

16. The adapter according to claim 9, wherein the second IPv4 network includes an IPv4 access network connected with the first IPv6 network via the access gateway, and an IPv4 home network with which the IPV4-compliant client is connected, with the IPv4 access network and the IPv4 home network interconnected via the adapter.

* * * * *